June 8, 1965  T. E. QUICK  3,187,501
METHOD OF AND APPARATUS FOR AUGMENTING THRUST AND SUPPRESSING
SOUND IN AIRCRAFT, ROCKETS, AND THE LIKE
Filed Dec. 19, 1960  2 Sheets-Sheet 1
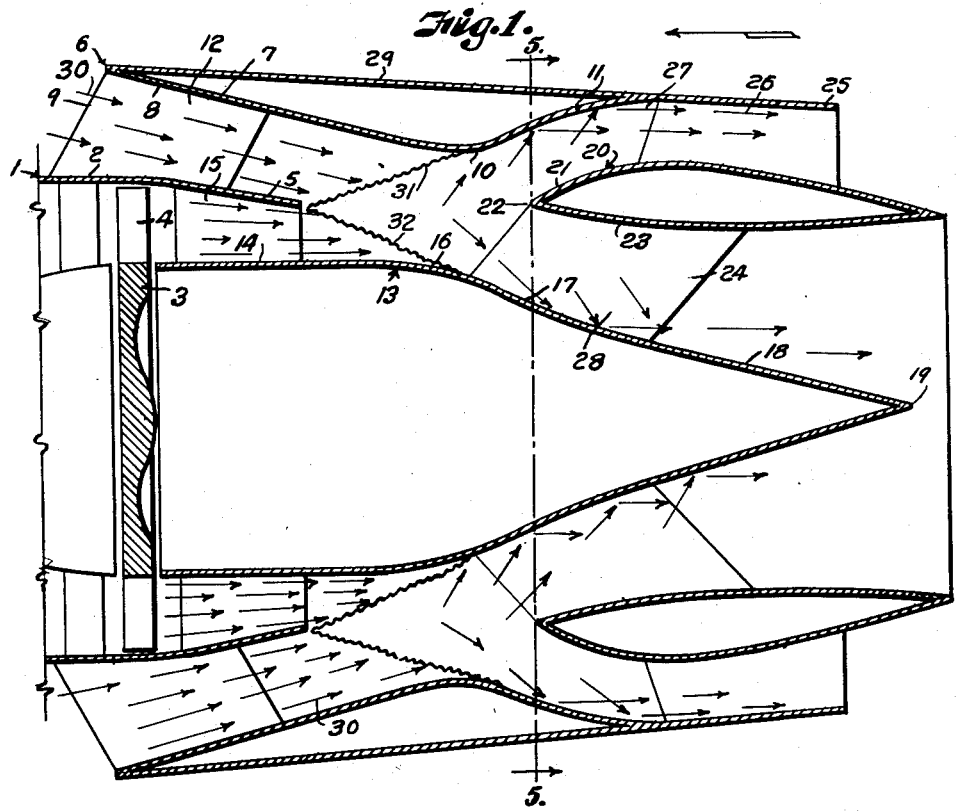
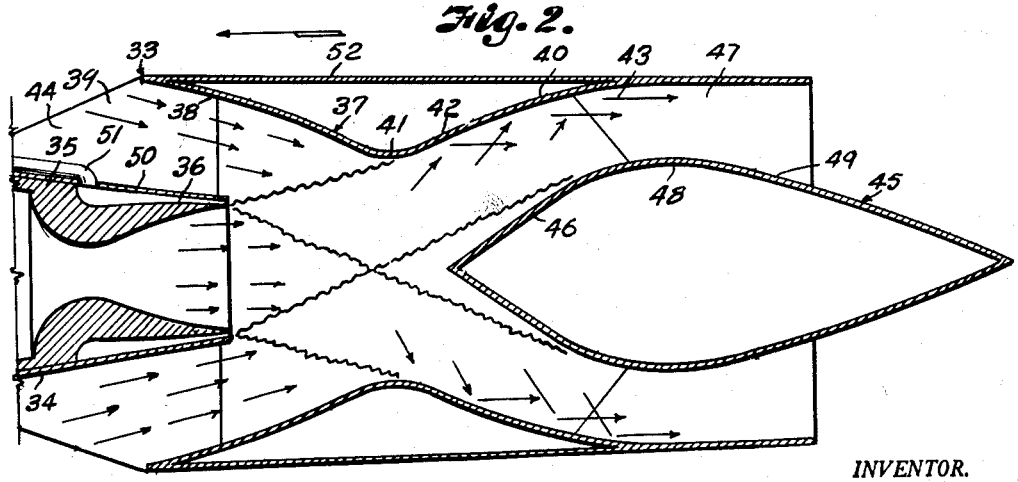
INVENTOR.
Thomas E. Quick
BY
*Paul E. Mullendore*
ATTORNEY June 8, 1965   T. E. QUICK   3,187,501
METHOD OF AND APPARATUS FOR AUGMENTING THRUST AND SUPPRESSING
SOUND IN AIRCRAFT, ROCKETS, AND THE LIKE
Filed Dec. 19, 1960   2 Sheets-Sheet 2
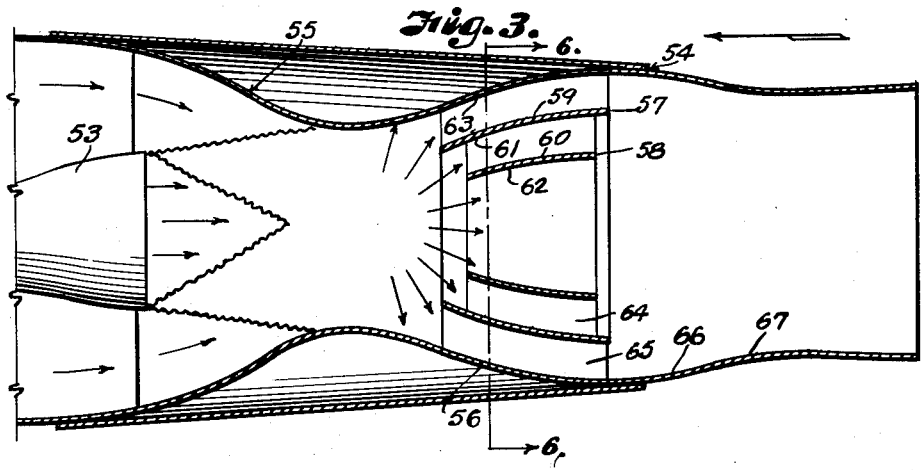
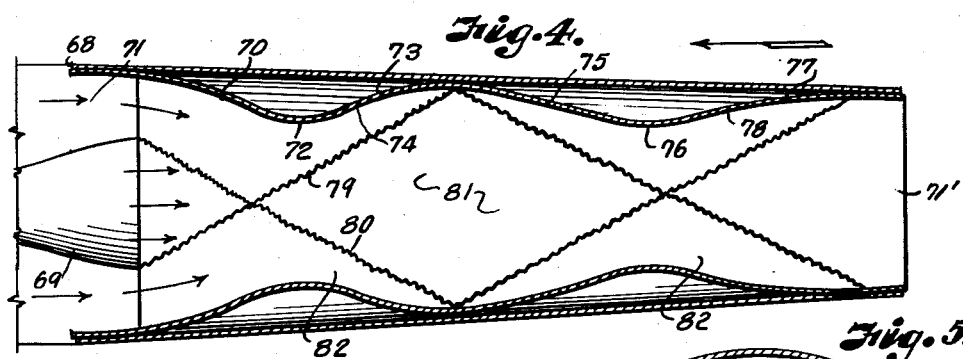
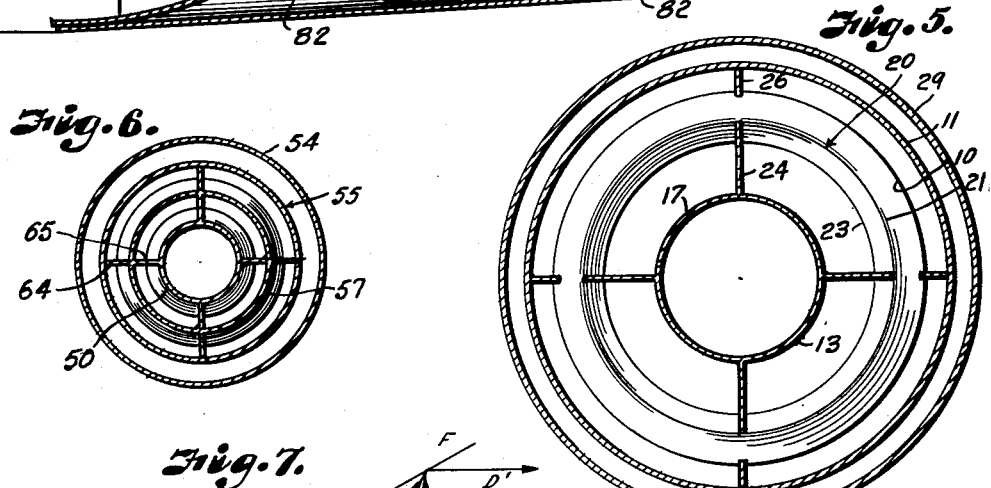
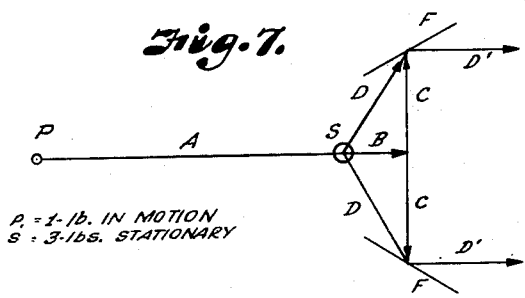
INVENTOR.
Thomas E. Quick
BY
Paul E. Mullendore
ATTORNEY United States Patent Office 3,187,501
Patented June 8, 1965

3,187,501
METHOD OF AND APPARATUS FOR AUGMENTING THRUST AND SUPPRESSING SOUND IN AIRCRAFT, ROCKETS, AND THE LIKE
Thomas E. Quick, 1616 Park Place, Wichita 3, Kans.
Filed Dec. 19, 1960, Ser. No. 76,798
12 Claims. (Cl. 60—35.6)

The present application is a continuation-in-part of my copending application Serial No. 748,850, for Thrust Augmenter, filed July 16, 1958, and now abandoned.

This invention relates to a method of and apparatus for augmenting the thrust of a high velocity jet stream in the propulsion of aircraft, rockets, and the like.

Jet propulsion is usually produced by compressing air and adding heat thereto by combustion of a fuel, to provide a high pressure gas mixture that is discharged as a high velocity jet stream through a discharge nozzle. The propulsive efficiency of such jet streams is very low, especially at relatively low flight speeds, consequently jet engines, rockets and the like expend a great amount of waste energy at takeoff and at relatively slow flying speeds. Another disadvantage is the objectionable noise which results in the discharge of such jets.

Since thrust of a high velocity jet stream is effected by mass acceleration of the jet stream, it has been assumed that an increase in the mass flow of a jet stream can be attained through introduction and mixture therewith of one or more streams from flight velocity, to thereby increase the thrust efficiency of the jet stream. Much research has been has been carried on in attempts to provide such thrust augmentation for high velocity jet streams, however, the results which have been attained give little evidence that the efficiency could be increased to the degree necessary for efficient propulsion of aircraft, rockets, and the like.

Prior attempts have relied upon the frictional contact between the hot high velocity jet stream and the introduced secondary mass of air from the atmosphere to accelerate the secondary mass. By experimental research it has become conclusive that the frictional contact is not sufficient. Therefore, the potential of thrust augmentation has been discouraging to the point where very little hope is felt and research has not been carried on to advance the art. Instead, propulsion engineers have turned to turbo-propellers and turbo-fans to more efficiently utilize the kinetic energy of the jet to take hold of a larger mass and thereby increase the propulsive efficiency from a given amount of energy.

The point that seems to have been entirely overlooked in the art of thrust augmentation is the failure to provide a reaction surface to increase the linear momentum. Direction of a jet through a straight tube will induce a mass of air and thereby increase the total weight of the moving stream, but there will be no linear momentum increase and no upstream reaction unless there is a surface provided on which the resulting impact pressures can act upon and then rebound in a linear direction therefrom.

I have discovered that the primary reason for limited success in thrust augmentation is the failure to obtain full use of the impact forces of the primary and secondary streams for effecting a radial or tangential momentum gain that can be utilized against reaction surfaces of the duct in which the mixing takes place.

The law of conservation of momentum, as generally applied to all collision phenomena, states that when two or more bodies collide with each other, momentum is conserved, and the total momentum before impact equals the total momentum after impact. The conservation of momentum law as written, therefore, refutes the possibility of thrust augmentation of high velocity streams without the use of additional energy. However, when the colliding masses are free to disperse, radial pressures are produced that can be utilized to increase propulsion.

It is, therefore, the principal object of the present invention to provide a method for impacting a secondary stream or streams under the introduced velocity with the primary jet stream to provide a dispersing force resulting from the colliding masses, so that they exert forces in a new and radial direction to provide radial pressure; and to provide an augmenter configuration that utilizes such radial pressure, thereby increasing the propulsion forces that may be obtained from a given high velocity jet stream.

The tremendous noise associated with large high velocity hot jet streams is primarily due to the relatively high velocity of the jet stream entering the atmosphere and the violent churning vibrations created thereby. The noise is greatest at takeoff when the relative velocity of the jet stream and the atmospheric air is greatest.

My augmenter reduces the noise by first causing a mass of air to be set in motion in the same direction as the jet stream before impact, to reduce the relative velocities and the violence of impact. The present augmenter also surrounds the place of impact, slows down the high velocity jet, and releases the combined mass at less velocity than the original velocity.

In accomplishing these and other objects of the invention as hereinafter pointed out, I have provided improved structure, the preferred forms of which are illustrated in the accompanying drawings, wherein:

FIG. 1 is a diagrammatic sectional view of the discharge end of a jet engine equipped with an augmenter constructed in accordance with the present invention and capable of attaining thrust augmentation in accordance with the present method of mixing and impacting the masses of the jet stream from the engine and air flow from flight velocity.

FIG. 2 is a similar sectional view of the tail portion of a rocket equipped with a thrust augmenter constructed in accordance with the present invention.

FIG. 3 is a similar sectional view of the nozzle portion of a rocket equipped with a thrust augmenter of a modified design.

FIG. 4 is a further modified form of augmenter for a rocket and capable of thrust augmentation in accordance with the present invention.

FIG. 5 is a cross section through the jet augmenter of FIG. 1 on a reduced scale and taken on the line 5—5 of FIG. 1.

FIG. 6 is a cross section through the jet augmenter illustrated in FIG. 3, the section being taken on the line 6—6.

FIG. 7 is a diagram of the forces of momentum when the collision phenomena relates to two streams of widely different velocities, as in the case of the present invention.

Referring more in detail to the drawings, and first to the form of invention illustrated in FIG. 1:

1 designates an engine having a casing 2 containing a turbine 3 that is provided with blades 4 against which high velocity gas is discharged as a jet stream through a nozzle-like formation 5 of the casing 2 for exerting thrust in assisting in the propulsion of the aircraft or the like carrying the engine 1. As above stated, such jet streams are in themselves of extremely low efficiency, particularly at low velocity of the aircraft, and it is the purpose of the present invention to more efficiently utilize the energy of the jet stream discharged from the engine, and thereby increasing the effects of the propulsion force. Therefore, in accordance with the present invention the engine is provided with an augmenter 6 to induce flow of a secondary air stream under flight velocity into mixing contact with the jet stream in such a manner as to use the impact of the streams to produce radial velocities to be deflected by reaction thrust surfaces for more effective propulsion of the aircraft.

The thrust augmenter 5 comprises a generally converging diverging tube or case 7 having a forward or inlet end 8 of larger diameter than the discharge or exhaust end of the casing 2 and into which the converging end 5 of the casing projects to provide therebetween an annular air inlet 9 for admission of a secondary air stream in encircling relation with and in response to the high velocity discharge of the jet stream. The wall of the forward portion 8 of the tube converges rearwardly and inwardly toward the axis of the jet stream to bring the secondary air stream into collision with the higher velocity jet stream that is confined by the smaller portion of the tube, as indicated at 10. The annular portion 10 determines the place from which rebound can best be utilized for providing the radial forces on the diverging portion 11 of the tube 7 in accordance with the present invention. With the tube thus shaped, the flared rear end 11 constitutes an annular inclined plane on which the radial pressure reacts, as later described. The tube 7 is supported in coaxial relation with the axis of the casing 2 by arms or struts 12 having their inner ends attached to the casing 2 and their outer ends to the inner surface of the converging portion 8 of the tube. The struts 12 also serve to transmit the reactionary force on the flared end 11 to the casing 2.

Concentrically supported within the discharge end of the casing 2 is a center cone 13 having a generally cylindrical base portion 14 received concentrically within the discharge end 5 of the engine casing and supported therein on arms 15 having their inner ends fixed to the cylindrical base portion 14 of the cone and their outer ends fixed to the inner surface of the discharge end of the casing 2. The cylindrical base portion 14 of the cone converges rearwardly on a sweeping curve 16 and a reverse curvature 17 into a cone 18. The cone 18 provides an annular inclined plane to cooperate with and supplement the thrust on the tube 7. The point 19 of the cone is illustrated as projecting beyond the terminal rear end of the tube 7. The cone 18 is circled by a streamline filler ring 20 that is of circular cross section and has an outer forward portion 21 generally conforming to the curvature of the rear end of the tube 7. The curved outer forward portion of the filler ring has an annular forward nose 22 joining with an inwardly and rearwardly curving inner wall 23. The rear ends of the inner and outer wall portions 21 and 23 converge rearwardly and join beyond the tip of the cone 18 in an annular tail portion 24. The streamline filler ring 20 is supported coaxially of the cone 18 on arms 24 that have their inner ends fixed to the walls of the cone and their outer ends fixed to the inner wall of the filler ring. The filler ring is further secured to a rearward continuation 25 of the tube 7 by similar arms 26. The filler ring thus divides the annular outlet between the cone 18 and the tube 7 to provide an outer annular passageway 27 on the side of the thrust plane of the tube 7 and an inner annular flaring passageway 28 that encircles the thrust plane of the cone. The tube 7 has an exterior cowling 29 to provide a better streamline flow of the exterior air.

With the engine in operation, hot gases are discharged from the nozzle portion 5 of the casing and around the central cone, as indicated by the arrows 30, and spreads to the constricted portion 10 of the tube 7. Simultaneously, exterior air is drawn through the annular inlet 9 to contact the jet stream, and when the aircraft is in operation the quantity of exterior air is increased by ram action of the air flow under flight velocity. The converging passageway directs the mass of the air flow across the path of the jet stream as the jet stream spreads, so that the masses of the two streams make impact under high velocity of the streams along the shock lines 31 and 32. The particles of the jet stream collide with slower moving particles of the air stream to create shock waves in angular directions to rebound from off the inclined plane of the flaring portion 11 of the tube 7 and the cone 18 with an increased linear momentum.

This action is explained by the fact that when two or more elastic masses collide, a radially dispersing shock wave is produced, and radiate radially to exert a pressure on the inclined planes to cause rebound in a linear direction thereby increasing the momentum of the aircraft in a linear direction to a value greater than the momentum of the aircraft before collision.

According to an article by Johnson and Lee published in a N.A.C.A. research memorandum, the theoretical increase in momentum effected by mixing and expanding two streams under ideal conditions, with the principles of this augmenter, should be proportional to the ratio of $$\sqrt{\frac{(M+1)(M+T)}{M+\sqrt{T}}} = \text{ratio of } \frac{A}{J}$$

when:

$M=$ quotient obtained by dividing the introduced air mass flow per second by the hot jet mass flow
$T=$ quotient obtained by dividing the absolute temperature of the hot jet stream by the absolute temperature of the introduced air stream
$J=$ thrust of the hot jet stream alone $=1$
$A=$ total thrust of jet with augmenter The total momentum after impact depends upon the relative velocities before impact and is equal to the square root of the combined mass ratios divided by the ratio of the original mass possessing the relative momentum times the original relative momentum. Since the momentum of a body in motion increases directly as the velocity increases and the kinetic energy increases as the square of the velocity:

$$M = \frac{WV}{g}$$

$$E = \frac{WV^2}{2g} = 1/2mV^2$$

where:

$M=$ momentum $=$ mass $\times$ velocity
$E=$ kinetic energy in ft. lbs.
$W=$ weight of body in lbs.
$V=$ velocity in ft. per sec.
$g=$ gravity $=32$ $$m = \frac{W}{g} = \frac{W}{32}$$

Then the momentum increase as the result of the collision of two perfectly elastic bodies free to disperse becomes:

$$\sqrt{\frac{P+S}{P}} = \frac{\text{Total momentum after collision}}{\text{Momentum before collision}}$$

where:

$P=$ primary mass in motion
$S=$ ratio of secondary mass at rest to primary mass As an example: If 1 lb. of perfectly elastic, free-to-disperse mass in motion collides with 3 lbs. of perfectly elastic, free-to-disperse mass at rest, the equation becomes:

$$\sqrt{\frac{1+3}{1}} = \frac{2}{1} = 2$$

Thus, the total momentum after collision, linear plus radial, equals two times as much as the total momentum before collision, while the linear momentum and the total kinetic energy remain the same.

In the diagram illustrated in FIG. 7, P represents the 1 lb. mass in motion. S represents the 3 lb. stationary mass. A represents linear velocity of P before collision of P with S. B represents linear velocity of P plus S or 4 lbs. after collision.

The lines F indicate the inclined reaction and deflection surfaces of the flared portion 11 of the augmenter of FIG. 1. The lines C indicate the lateral dispersing momentum value. D represents the resultant directional velocity and/or momentum value of the vectors B and C which is the velocity that the 4 lb. mass is deflected off the surface F for redirection to a linear direction and to receive the upstream reaction force therefrom. D' represents the linear momentum value D after D has rebounded off the surfaces F. The kinetic energy of P at velocity A equals the kinetic energy of $$\sqrt{B^2+C^2}$$

or the resultant D or D' at their respective directional force velocities. Kinetic energy has been conserved by use of the additional mass and the inclined redirecting and reacting surfaces F, but the linear momentum of P (1 lb.) at A velocity has been increased to the linear momentum value D' (4 lbs.) at D' velocity, which is in accordance to the total momentum gain value formula $$\sqrt{\frac{P+S}{P}}$$

is 2. Consequently, the reaction has been doubled without addition of kinetic energy. Reference, Netwon's Third Law, "Action force equals reaction force."

By the above analysis, the total directional momentum is consistent with the conservation of energy law, and the linear momentum before deflection is consistent with the conservation of the linear momentum law. It is thus understood that the radial momentum is utilized to attain the force for reaction upon the inclined surfaces to augment the propelling action of the jet. The cross sectional areas of an augmenter tube vary inversely as the velocity of the fluid passing therethrough, and since there has been an increase in linear momentum by impact of the fluids between the inlet and outlet of the augmenter, the outlet area must be of smaller size than the inlet area to accommodate the smaller cross section stream area resulting from the increase overall velocity between the inlet and outlet.

The form of the invention illustrated in FIG. 2 illustrates a modification of the invention which includes an augmenter 33 that is associated with the rear of a rocket 34. The rocket 34 has a discharge nozzle 35 including a flaring portion 36 for effecting high velocity discharge of hot gases therethrough. The thrust augmenter 33 comprises a generally converging-diverging tube 37 having a forward portion 38 of larger diameter than the nozzle 35 and into which the nozzle projects to provide therebetween an annular air inlet 39 for admission of a secondary air stream responsive to jet stream and flight velocity. The forward portion 38 of the tube converges rearwardly and inwardly toward the axis of the jet stream to assure collision and mixture of the air and high velocity jet stream. The rear portion 40 of the tube 37 continues from the constricted portion 41 rearwardly in a sweeping curve 42 and flares outwardly and rearwardly to provide an annular outlet 43 of less overall area than the combined overall area of the inlet 39 and rocket outlet 36. With the tube thus shaped, the rear end constitutes an inclined annular plane as in the first described form of the invention. The tube is supported in coaxial relation with the nozzle by arms or struts 44 having their inner ends attached to the nozzle 35 and their outer ends to the inner surface of the tube 37. The arms 44 also serve to transmit thrust from the tube to the rocket.

Concentrically supported within the discharge and of the tube is a streamline filler plug 45 having a generally conical forward end 46 located concentrically within the discharge end of the tube 37 and supported therein on arms 47 having their inner ends fixed to the base portion 48 of the cone and their outer ends fixed to the inner surface of the discharge end of the tube 37. The rear end of the conical portion 46 is closed by a reversely arranged cone 49 extending beyond the discharge end of the tube 37 to provide an inclined thrust plane cooperating with the thrust plane of the outer tube. If desired, the nozzle 35 may be provided with a fuel supply means 50 that encircles the nozzle and discharges the fuel into the hot gases to be dispersed therein. The fuel is supplied through a duct 51. The tube 37 is also provided with a cowl 52.

The augmenter throat should be so spaced with respect to the jet nozzle that the momentum of the hot jet gases and the momentum of the air will be substantially equalized when they pass through the throat of the augmenter. This spacing will not be hard to determine, since the augmenter will have its greatest thrust at this spacing.

When the configuration FIG. 2 is used as an augmenter and afterburner, the tube 37 will be extended some to provide for the greater expansion of the gases resulting from the addition of heat by the burning of the additional fuel.

This form of the invention operates in the same manner as the first form of the invention by directing the air stream into the jet stream to obtain the mixing and dispersion as above described, whereby the radial forces of the impact act upon the flaring end 43 of the tube 33 to produce the resulting increased propulsion.

FIG. 3 illustrates a further modified construction attached to the nozzle 53 of a rocket. The augmenter 54 includes a converging-diverging tube 55 similar to the first forms of the invention, and the diverging portion 56 contains inner and outer concentric converter or redirecting and reacting rings 57 and 58 having outwardly curving annular walls 59 and 60 to provide reaction areas 61 and 62 cooperating with the reaction area 63 of the diverging portion of the tube. The impact between the air flow and the high velocity jet stream takes place in front of the redirecting and reacting rings, so that the rebounding forces act against the reaction areas as indicated. The rings are held in position by struts 64 between the rings 57 and 58 and 65 between the outer ring 57 and the tube 55 (FIG. 6). The discharge end of the augmenter curves inwardly as at 66 and then slightly outwardly as at 67.

The augmenter 68 of FIG. 4 is also applied to the discharge nozzle 69 of a rocket. The tube 70 converges from the air inlet end 71 to the discharge end 71'. The inlet end converges to a restricting portions 72, then diverges as at 73 to provide a high pressure reaction area 74. The diverging portion 73 converges as at 75 to a second constricting portion 76, which in turn diverges outwardly and rearwardly as at 77 to provide another reaction area 78. In this form of the invention, the shock waves 79 and 80 conform with the mach diamonds of a rocket stream. Relatively low pressure 81 is produced within the shock wave lines 79 and 80 and high pressure 82 is produced exteriorly of the shock lines to react on the areas.

The augmenter of FIG. 4 will necessarily be a little longer than the plug types of the other forms of the invention, but the principle is the same in that high pressure is produced on the diverging portions and low pressures on the converging portions.

In all forms of the invention (FIGURES 1, 2, 3, and 4) the combined areas of air inlet (area 9 in FIGURE 1, area 39 in FIGURE 2, area at forward end of tube 55 in FIGURE 3, and area at 71 in FIGURE 4) and engine or rocket exhaust nozzle (area 5 in FIGURE 1, area 36 in FIGURE 2, area 53 in FIGURE 3, and area 69 in FIGURE 4) are greater than the area or combined areas of augmenter outlet (areas at 27 and 28 in FIGURE 1, area at 43 in FIGURE 2, area at 67 in FIGURE 3, and area at 71' in FIGURE 4). This, in effect, accommodates greater velocity at augmenter outlet than at augmenter inlet of the air added to the engine or rocket exhaust.

What I claim and desire to secure by Letters Patent is:
1. In combination, a nozzle for discharging a high velocity hot jet stream to effect a forward propulsion force by reaction of the jet stream, and an augmenter case for suppressing sound and for providing additional propulsion force, said augmenter case having an upstream inlet end encircling the nozzle for admitting an air stream into the jet stream via injector action issuing from said nozzle, said augmenter case having an annular wall portion converging inwardly from said inlet end to provide a restriction of substantially greater area than said nozzle to reduce the relative velocity between the jet and air streams, and said restriction being so located in the area of collision of said streams as to produce radial rebound of the particles of said streams resulting from said collision, said wall portion diverging outwardly from said restriction and providing an annular inclined reaction plane in the area of radial rebound and being so disposed as to produce deflection and redirection of the radial rebound with increased momentum, and said wall portion turning and reducing in exhaust area from said diverging portion and terminating in an exhaust end to conserve the increase in momentum while utilizing the reaction on said annular inclined plane to increase the forward propulsive force by said jet stream, the combined areas of said nozzle and the inlet in said case for admitting an air stream being greater than the exhaust area of said case.

2. In combination, a nozzle for discharging a high velocity hot jet stream to effect a forward propulsion force by reaction of the jet stream and an augmenter case as described in claim 1, and including means for admitting fuel into the high velocity hot jet stream at the discharge thereof and into the augmenter case ahead of the restriction for burning within the restriction of the augmenter.

3. In combination, a nozzle discharging a high velocity hot jet stream to effect a forward propulsion force by reaction of the jet stream and an augmenter case for providing an additional propulsion force as described in claim 1, wherein said nozzle is an expanding jet nozzle, and includes means associated with the nozzle for introducing a fuel for dispersion into the jet stream at the discharge of said nozzle and prior to said rebound of said streams.

4. In combination, a nozzle discharging a high velocity hot gas jet stream to effect a forward propulsion force by reaction of the jet stream, and a thrust augmenter case as described in claim 1, and a concentric redirecting ring encircled by the diverging wall portion and having an outer portion conforming to said diverging wall portion to provide additional inclined reaction planes for cooperating with the reaction plane of the augmenter for deflecting said radial rebound and imparting additional reaction forces on said inclined planes.

5. In combination, a nozzle discharging a high velocity hot gas jet stream to effect a forward propulsion and a thrust augmenter case as described in claim 1, and including a streamline filler plug having an outer surface conforming in shape with the diverging wall portion of the thrust augmenter and having a diameter substantially corresponding with the diameter of said restriction, and means for supporting said streamline filler plug concentrically within the augmenter case with the outer surface of the filler plug cooperating with the diverging wall of the augmenter case for providing a passageway for the portions of the stream deflected from said diverging wall portion.

6. In combination, a nozzle discharging a high velocity hot gas jet stream to effect a forward propulsion force by reaction of the jet stream, and a thrust augmenter case for increasing the propulsion force, as described in claim 1, and including a streamlined cowl about the augmenter and extending from the inlet end to the exhaust end.

7. In combination with an engine having a nozzle for discharging a high velocity hot jet stream to effect a forward propulsion force, a central member having a cylindrical portion concentrically of the nozzle and terminating in a rearwardly projecting cone portion to provide a streamline filler and an inclined reaction plane, and a thrust augmenter case for increasing the propulsion force and having an inlet at one end encircling the nozzle and an outlet at the other end encircling the apex of the cone portion, said thrust augmenter case having an annular wall converging inwardly from said inlet end to provide a restriction in encircling relation with the juncture of the cylindrical portion with the cone portion of said central member for directing air into the jet stream incidental to flight velocity for impact of the jet stream with the air stream and for producing radial rebound of the particles of said streams near the point of the restriction, said augmenter case having a wall portion diverging from said restriction to provide an inclined reaction plane cooperating with the reaction plane of the central member for deflection of the radial rebound in the linear direction of flight.

8. In combination with an engine having a nozzle for discharging a high velocity hot jet stream to effect a forward propulsion force, a central member having a cylindrical portion concentrically of the nozzle and terminating in a rearwardly projecting cone portion to provide a streamline filler and an inclined reaction plane, a thrust augmenter case for increasing the propulsion force and having an inlet at one end encircling the nozzle and an outlet at the other end encircling the apex of the cone portion, said thrust augmenter case having an annular wall converging inwardly from said inlet end to provide a restriction in encircling relation with the juncture of the cylindrical portion with the cone portion of said central member for directing air into the jet stream incidental to flight velocity for impact of the jet stream with the air stream and for producing radial rebound of the particles of said streams near the point of the restriction, said augmenter case having a wall portion diverging from said restriction to provide an inclined reaction plane cooperating with the reaction plane of the central member for deflection of the radial rebound in the linear direction of flight, a streamline filler ring having an outer surface conforming in shape with the diverging wall of the thrust augmenter case and of an outer diameter substantially corresponding with the diameter of said restriction, and means for supporting the streamline filler ring concentrically of said cone portion of the central member to render both of said reaction planes effective in deflecting radial rebound.

9. In combination, a nozzle discharging a high velocity hot gas jet stream to effect a forward propulsion force by reaction of the jet stream, and a thrust augmenter case for increasing the propulsion force and having an upstream inlet end encircling the nozzle, said thrust augmenter having annular wall portions converging inwardly from said inlet and providing linearly spaced apart restrictions in encircling contact with the jet stream for ramming air into the jet stream incidental to flight velocity, said restrictions being so located in the area of collision of said streams as to produce radial rebound of the particles of said streams resulting from said collision, said augmenter having wall portions diverging outwardly from said restrictions to provide a series of annular inclined reaction planes and being so disposed in the area of radial rebound as to produce deflection of the radial rebound with increased momentum, and said case turning and reducing in exhaust area from the last of the diverging portions and terminating in an exhaust end to effect increased impact pressure at said restrictions for increasing the reaction on said annular inclined reaction planes, the combined areas of said nozzle and the inlet in said case for admitting an air stream being greater than the exhaust area of said case.

10. In combination, a nozzle discharging a high velocity hot gas jet stream to effect a forward propulsion force by reaction of the jet stream, a thrust augmenter case for increasing the effect of the propulsion force as described in claim 9, and including a streamlined cowl covering the exterior of the augmenter and converging from the inlet end to the outlet end.

11. The method of increasing the effective propulsion force of a high velocity hot jet combustion stream on a flight vehicle, comprising:
   (a) collecting an air stream incidental to vehicle flight velocity and discharging said air stream in a directing and defining manner into impact with a high velocity hot jet combustion stream producing radial rebound of component particles of said streams;
   (b) deflecting the radial rebound of said particles upon surface means connected to said vehicle that diverge in the downstream direction of said streams, and turning and redirecting said particles rearwardly oppositely to the direction of vehicle flight and thereby applying thrust on said surface means for supplementary propulsion force on said vehicle; and
   (c) exhausting said streams at high velocity and restricting said streams from said surface means to the exhaust to the extent that the area of exhaust of said streams has less area than the combined areas of the original area of said air stream and the original area of said jet stream before they are impacted, thereby to prevent loss of momentum and to conserve velocity.

12. The method of increasing the effective propulsion force of a high velocity hot jet combustion stream on a flight vehicle, comprising:
   (a) collecting an air stream incidental to vehicle flight velocity and discharging said air stream in a directing and confining manner into impact with a high velocity hot jet combustion stream producing radial rebound of component particles of said streams;
   (b) deflecting the radial rebound of said particles upon a plurality of jutaposed surface means connected to said vehicle that diverge in the downstream direction of said streams, and turning and redirecting said particles rearwardly oppositely to the direction of vehicle flight and thereby applying thrust on said surface means for supplementary propulsion force on said vehicle; and
   (c) exhausting said streams at high velocity and restricting said streams from said surface means to the exhaust to the extent that the area of exhaust of said streams has less area than the combined areas of the original area of said air stream and the original area of said jet stream before they are impacted, thereby to prevent loss of monetum and to conserve velocity.

References Cited by the Examiner

UNITED STATES PATENTS

| 1,375,601 | 4/21 | Morize | 60—35.6 |
|---|---|---|---|
| 1,493,157 | 5/24 | Melot | 60—35.6 |
| 2,575,735 | 11/51 | Servanty | 60—35.6 |
| 2,671,313 | 3/54 | Laramee | 60—35.6 |
| 2,694,291 | 11/54 | Rosengart | 60—35.6 |
| 2,825,204 | 3/58 | Kadosch | 60—35.66 |
| 3,046,732 | 7/62 | Foa | 60—35.6 |
| 3,048,973 | 8/62 | Benedict. | |

FOREIGN PATENTS 547,128   8/56   Italy.

OTHER REFERENCES

Hausmann and Slack: Physics, third edition, published by D. Van Nostrand Co., Inc., copyright August 1948; page 75 relied on.

SAMUEL LEVINE, *Primary Examiner.*

ABRAM BLUM, *Examiner.*